United States Patent
Agnello (10) Patent No.: US 7,390,991 B1
(45) Date of Patent: Jun. 24, 2008

(54) HORIZONTAL CAROUSEL CONVEYOR

(75) Inventor: Frank Anthony Agnello, South Elgin, IL (US)

(73) Assignee: Prince Castle Inc., Carol Stream, IL (US)

( * ) Notice: Subject to any disclaimer, the term of this patent is extended or adjusted under 35 U.S.C. 154(b) by 9 days.

(21) Appl. No.: 11/590,090

(22) Filed: Oct. 31, 2006

(51) Int. Cl.
- *F27B 9/16* (2006.01)
- *B65G 21/16* (2006.01)
- *B65G 21/20* (2006.01)

(52) U.S. Cl. .................. 219/388; 99/443 C; 198/465.2

(58) Field of Classification Search ............. 198/465.2
See application file for complete search history.

(56) References Cited

U.S. PATENT DOCUMENTS

| | | | | |
|---|---|---|---|---|
| 1,620,120 | A * | 3/1927 | Morshead et al. | 198/465.2 |
| 1,690,439 | A * | 11/1928 | Wigglesworth | 198/346.1 |
| 2,465,611 | A * | 3/1949 | Singer | 198/684 |
| 2,517,360 | A * | 8/1950 | Singer | 99/421 R |
| 2,535,393 | A * | 12/1950 | Daugert | 392/435 |
| 2,631,216 | A * | 3/1953 | Ames | 392/418 |
| 2,678,372 | A * | 5/1954 | Salton | 219/220 |
| 2,718,188 | A * | 9/1955 | Read et al. | 99/386 |
| 2,745,363 | A * | 5/1956 | Balton | 425/334 |
| 3,744,403 | A * | 7/1973 | Castronuovo | 99/421 V |
| 5,006,355 | A * | 4/1991 | Stuck et al. | 426/243 |
| 5,173,320 | A * | 12/1992 | Stuck et al. | 426/523 |
| 5,176,068 | A * | 1/1993 | Stuck et al. | 99/443 C |
| 5,688,466 | A * | 11/1997 | Mitchell et al. | 264/458 |
| 6,005,223 | A * | 12/1999 | Ogihara | 219/388 |
| 6,523,462 | B1 * | 2/2003 | Johnson et al. | 99/443 C |
| 7,013,080 | B1 * | 3/2006 | Kaplanis et al. | 392/422 |

* cited by examiner

Primary Examiner—Joseph M. Pelham
(74) Attorney, Agent, or Firm—Ladas & Parry LLP (57) ABSTRACT

A horizontal carousel conveyor moves in a horizontal plane by using vertically-oriented conveyor links. When used with an oven, it continuously moves foods and other items in a closed, horizontal loop.

12 Claims, 10 Drawing Sheets

HORIZONTAL CAROUSEL CONVEYOR

BACKGROUND

Conveyors are well-known to those or ordinary skill in the mechanical arts. Paraphrased, the Merriam-Webster's Collegiate Dictionary defines a conveyor as an endless moving belt or a chain of receptacles, which is useful to move articles from place to place.

Prior art conveyors are used to transport virtually any kind of object or material that is capable of being carried in, or on a container. Conveyors carry foods through, or along production lines in food preparation factories. Fast food restaurants and food service providers use conveyors to carry food products through an oven or along a food preparation line.

Virtually all of the prior art conveyors used in factories as well as in food preparation plants, food services and restaurants move in a single, vertically-oriented plane. Put another way, the prior art conveyors used to move food, move it along a straight line. The direction of an item carried by conveyor can be changed by moving a conveyor-carried item from a conveyor that runs in a first direction, onto a second conveyor that runs in a second direction. Prior art conveyors that move items in a straight line can also raise or lower the elevation of an item but they nevertheless move in substantially the same vertical plane.

In high-volume or fast food restaurants, the ability to quickly, reliably and continuously cook food items is important. Unusual or uniquely-shaped food items can be particularly difficult to prepare. Cone-shaped foods are particularly difficult to cook.

As used herein, the term "pizza cone" refers to an edible cone, the interior of which is filled with pizza fillings, such as meats, cheeses and other ingredients. The cone part of a pizza cone is usually made from pizza dough, however, cones made from other types of dough can also be filled with pizza fillings or other foods.

Because of its shape, a pizza cone is particularly difficult to heat and/or cook. Because if a cone is place on its "side" for cooking, fillings inside the cone will spill or fall out of the cone as temperature rises. If the cone is inverted so as to be cooked on a flat surface, the contents will nevertheless spill when the cone is removed from a heating surface to be turned upright for sale and consumption. One way to heat or cook a filled cone is to heat the cone while it is upright, i.e., with the pointed, narrow end of the cone downward, in order to keep fillings in the cone as it the cone is heated. A conveyor that can move foods and other objects and materials along tortuous paths in a horizontal plane, would be an improvement over the prior art because it would enable foods such as cones to be moved into and out of an oven while the items are held upright.

DETAILED DESCRIPTION

Figure 1:
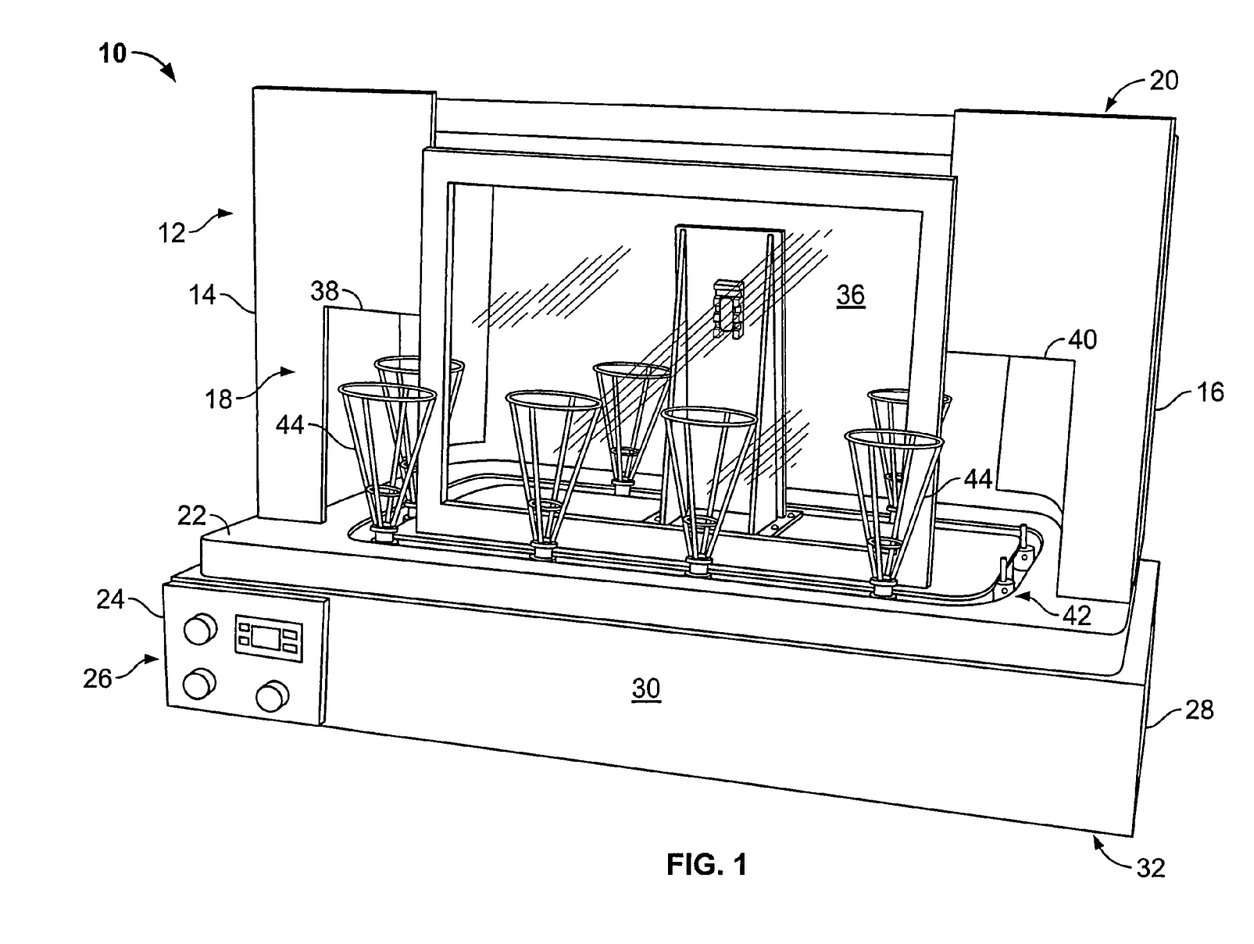
FIG. 1 shows a front elevation view of an oven for baking cones and cone-shaped foods.
Figure 2:
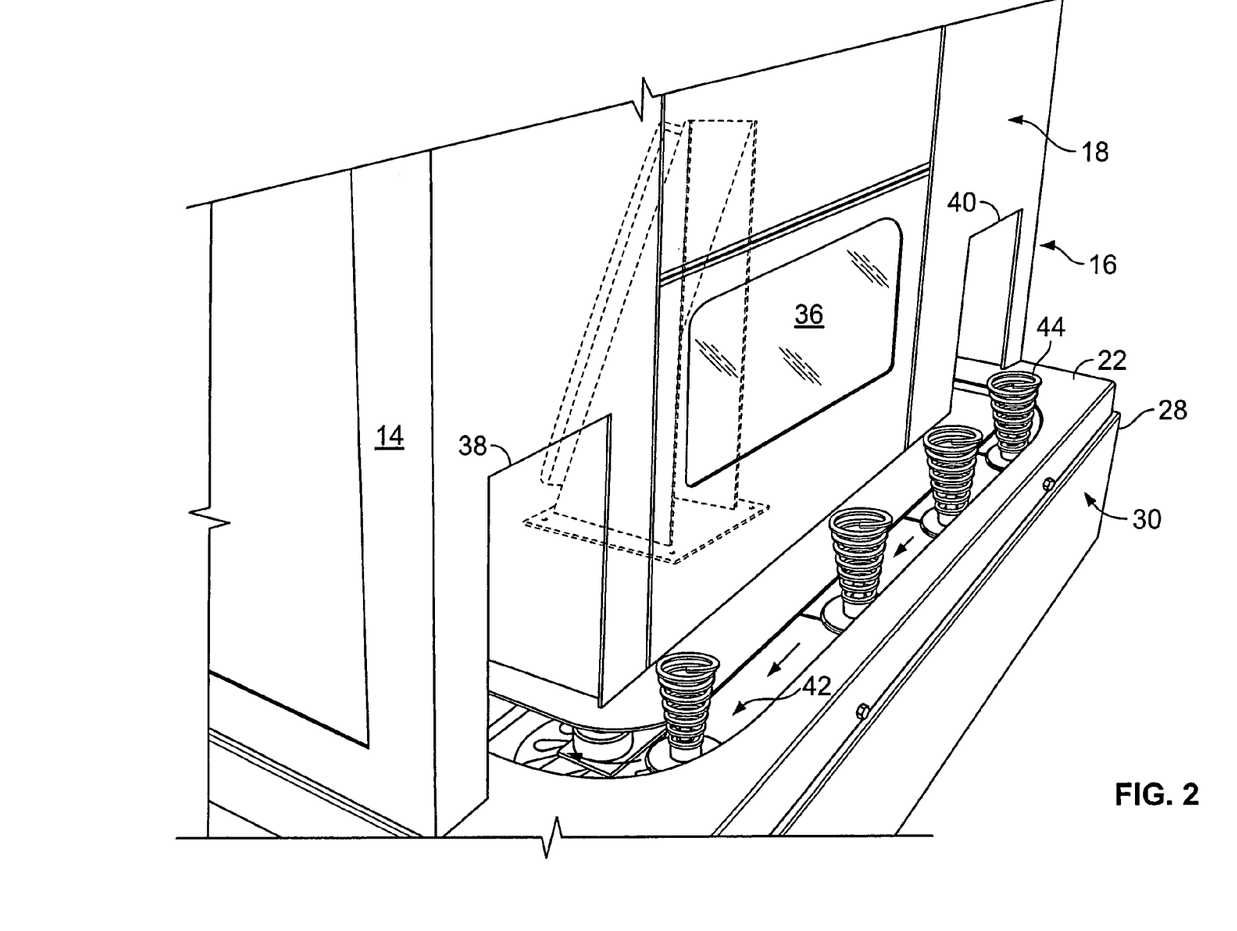
FIG. 2 shows a perspective view of the front side of an oven showing a view of a horizontal carousel conveyor that carries cone-shaped heating stations used to carry cone-shaped foods through the oven.

FIG. 1 shows a rectangular-shaped oven 10 particularly suited for baking cone-shaped dough and/or batter in order to cook cone-shaped foodstuffs such as pizza cones and ice cream cones. As set fort more fully below, the oven 10 can be readily adapted to cook other shaped food stuffs.

As best seen in FIG. 1, the oven 10 has an upper housing or box 12 having four sides and a top. The upper housing 12 of the oven 10 is attached to the top surface 22 of a base unit 24. In one embodiment, the upper housing 12 is attached to the base unit 24 by a hinge that is attached to the base unit 24 along the top rear edge (not shown) of the base unit 24 and the lower rear edge of the upper housing 12. The hinge between the upper housing 12 and the base unit 24 allows the upper housing 12 to be pivoted upwardly in order to provide access to the interior of the oven 10.

The base unit 24 shown in the figures is substantially rectangular. It has a left side 26, a right side 28, a rear side (not shown), a front side 30, a top 22, and a bottom 32. As can be seen in FIG. 1, the width of the upper housing 12 and the width of the base unit 24 are substantially equal such that the left and right sides of the upper housing 12 and the base unit 24 are substantially co-planar.

While the width of the upper housing 12 and the base unit 24 are the same, the depth of the base unit 24, is greater than the depth of the upper housing 12. The greater depth of the base unit 24 over the depth of the upper housing 12 provides a shelf surface 34 that extends forwardly of the front side 18 of the upper housing 12. As can be seen in the figure, the conveyor extends into the area of the shelf surface 34. In one embodiment, the front shelf 34 extends past the front side 18 of the upper housing 12 by about six inches.

In the embodiment of the oven 10 shown in FIG. 1, the front side 18 of the upper housing 12 is provided with a viewing window 36 by which an operator can view the cooking progress of cones or other food stuffs passing through the oven 10. The viewing window 36 is preferably made from a translucent, heat-tolerant glass or other translucent heat-tolerant material, such as quartz.

Importantly, the front side 18 of the upper housing 12 is provided with two passage ways or openings 38 and 40. The openings 38 and 40 are spaced apart from each other in the front side 18 so as to be located proximate to the left-hand side 14 and the right hand side 16 respectively.

A motor-driven, variable speed conveyor mechanism is enclosed in the base unit 24 that provides a closed-loop, horizontal carousel conveyor 42 (hereafter conveyor 42) and which can move items horizontally, i.e., in a horizontal plane. In the oven 10 shown in the figures, the conveyor carries heating stations 44. The heating stations 44 are attached to conveyor links (See FIGS. 4-9.) and can be used to carry foodstuffs along a circuitous path followed by the conveyor 44, the pathway of which takes the heating stations 44 past heating elements that are located in the upper housing 12 of the oven 10.

As shown, the heating stations 44 are vertically-oriented and sized, shaped and arranged to hold cone-shaped items upright, i.e., with the narrow, pointed end downwardly. The cones are held upright during heating and/or cooking so that contents within the cones do not fall out during a heating or cooking process. Thus, the heating stations 44 moves the cones held upright and in a horizontal plane. The cones are carried into the oven 10 through a first one of the openings (38 or 40) and out from the oven through the other opening (34 or 32). Since the heating stations 44 attached to the conveyor 42 travel in the same, substantially-horizontal geometric plane, the heating stations, and foods they carry, can be repeatedly carried past heating elements in the oven 10.

Figure 3A:
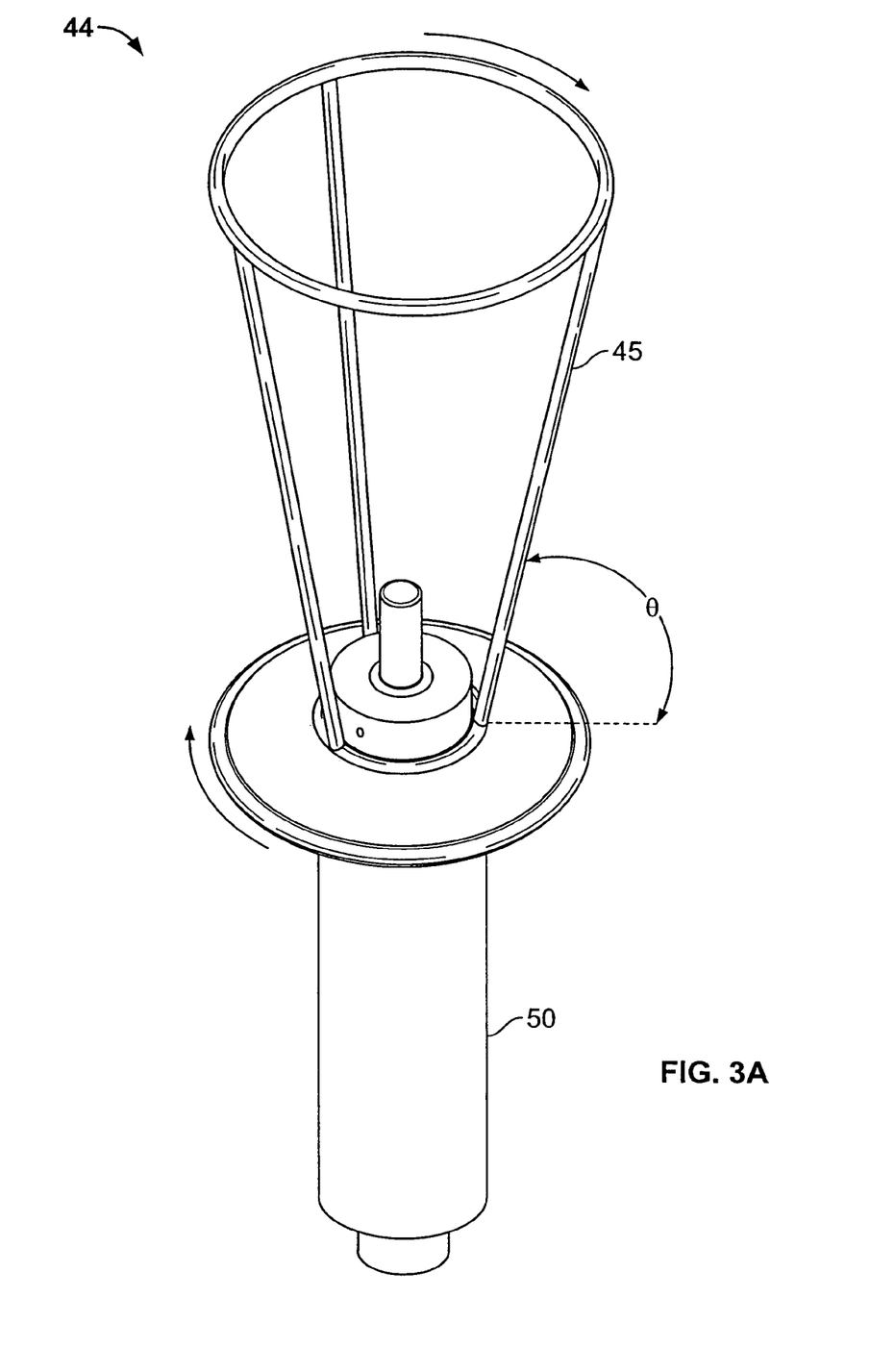
FIG. 3A shows one embodiment of a heating station for use in cooking or heating cone-shaped foods.
Figure 3B:
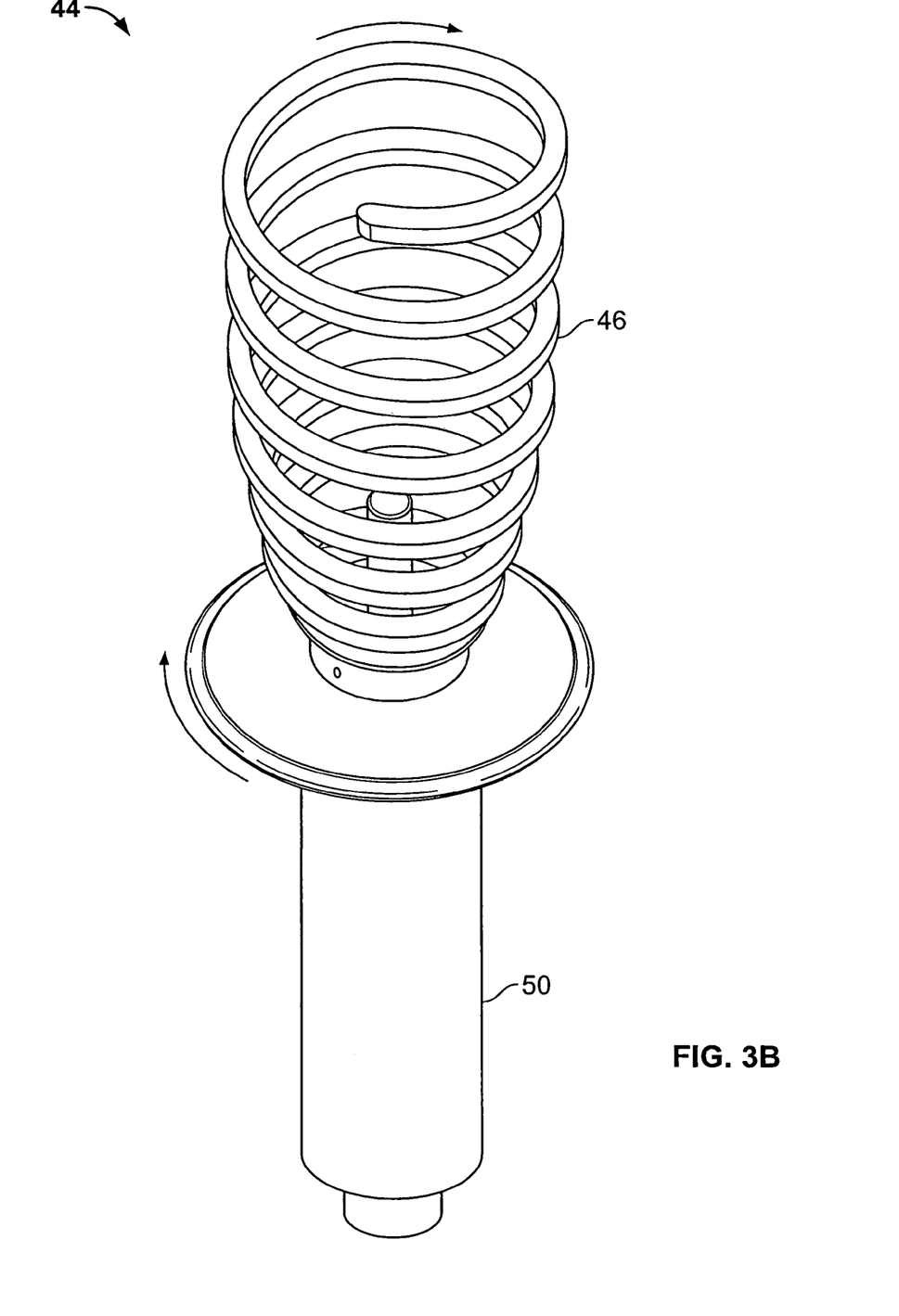
FIG. 3B shows a second embodiment of a heating station for use in cooking or heating cone-shaped foods.

Referring to FIGS. 3A and 3B, the heating stations 44 in one embodiment are cone-shaped wire baskets 45 having a geometric center axis of symmetry (not shown). When the basket 45 is attached to a mounting boss 50 that is attached to a link of the conveyor 42, the center axis of symmetry extends upward, orthogonal to the upper surface 22 of the base unit 24. In a second embodiment, the heating stations 44 are cone-shaped wire springs 46, which have a geometric central axis (not shown) about which the coils of the springs are wound. By placing a cone-shaped food item within a cone-shaped basket or a cone-shaped coil, heat is able to reach the cone to cook it as the basket or coil preserves the integrity of the cone.

As can be seen in FIGS. 5-9, each of the heating stations is attached to a heating station carrier mounting boss 50 that is attached to a single corresponding link that form the conveyor's chain using rivets, screws, bolts or other appropriate connective device. In the embodiment shown in the figures, the links 62 were rectangular metal plates. The plates are preferably aluminum because aluminum is relatively soft and easy to machine and very light as compared to steel or other metals. Because it is attached to a conveyor link, the carrier mounting boss 50 follows the path of the conveyor 42, taking the heating station 44 attached to the mounting boss 50 with it.

Figure 9:
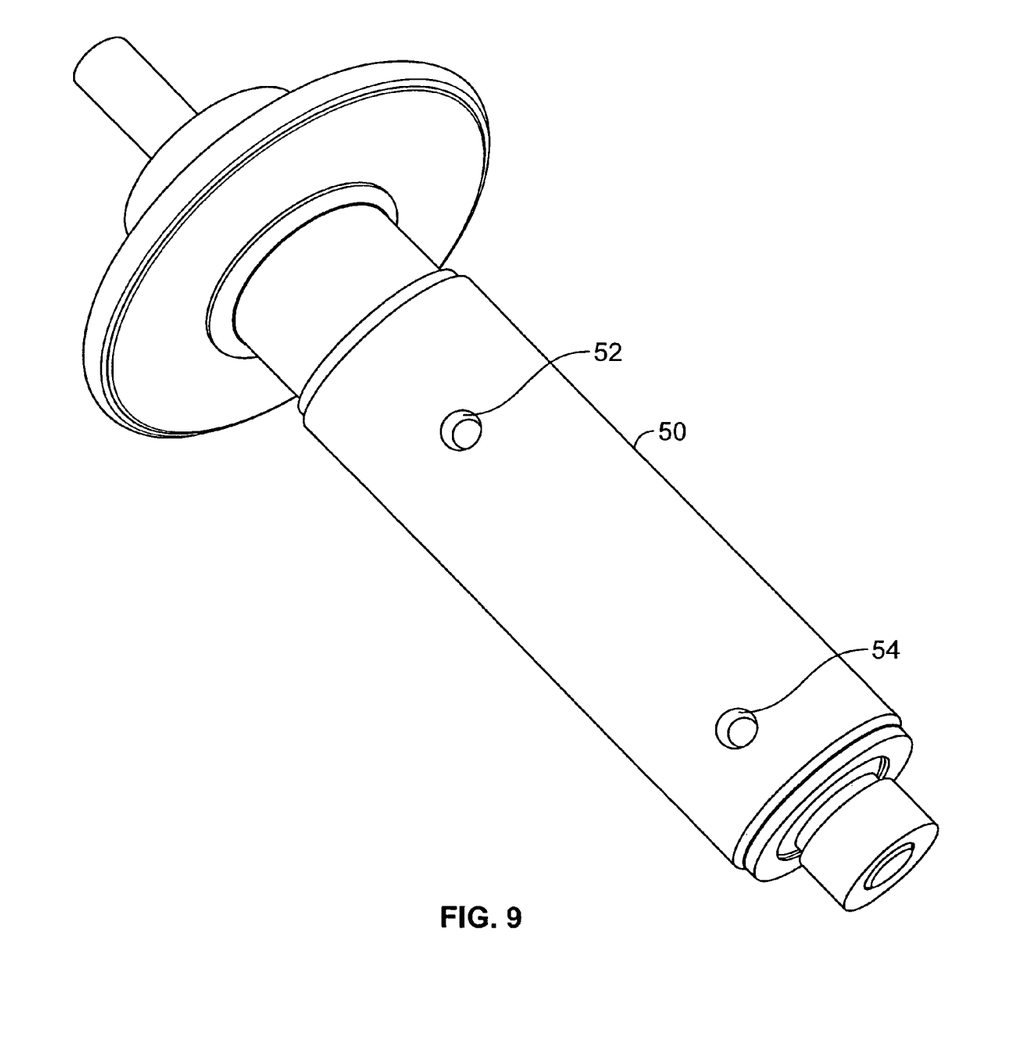
FIG. 9 depicts the mounting holes in the heating station base, by which the heating station is attached to a conveyor link.

As best seen in FIG. 9, two holes 52 and 54 in the heating station mounting boss 50 allow the heating station 44 to be attached to conveyor links by machine screws, rivets or sheet metal screws thereby enabling their removal for service. In an alternate embodiment, however, the heating station mounting boss 50 could be welded to a link.

Figure 4:
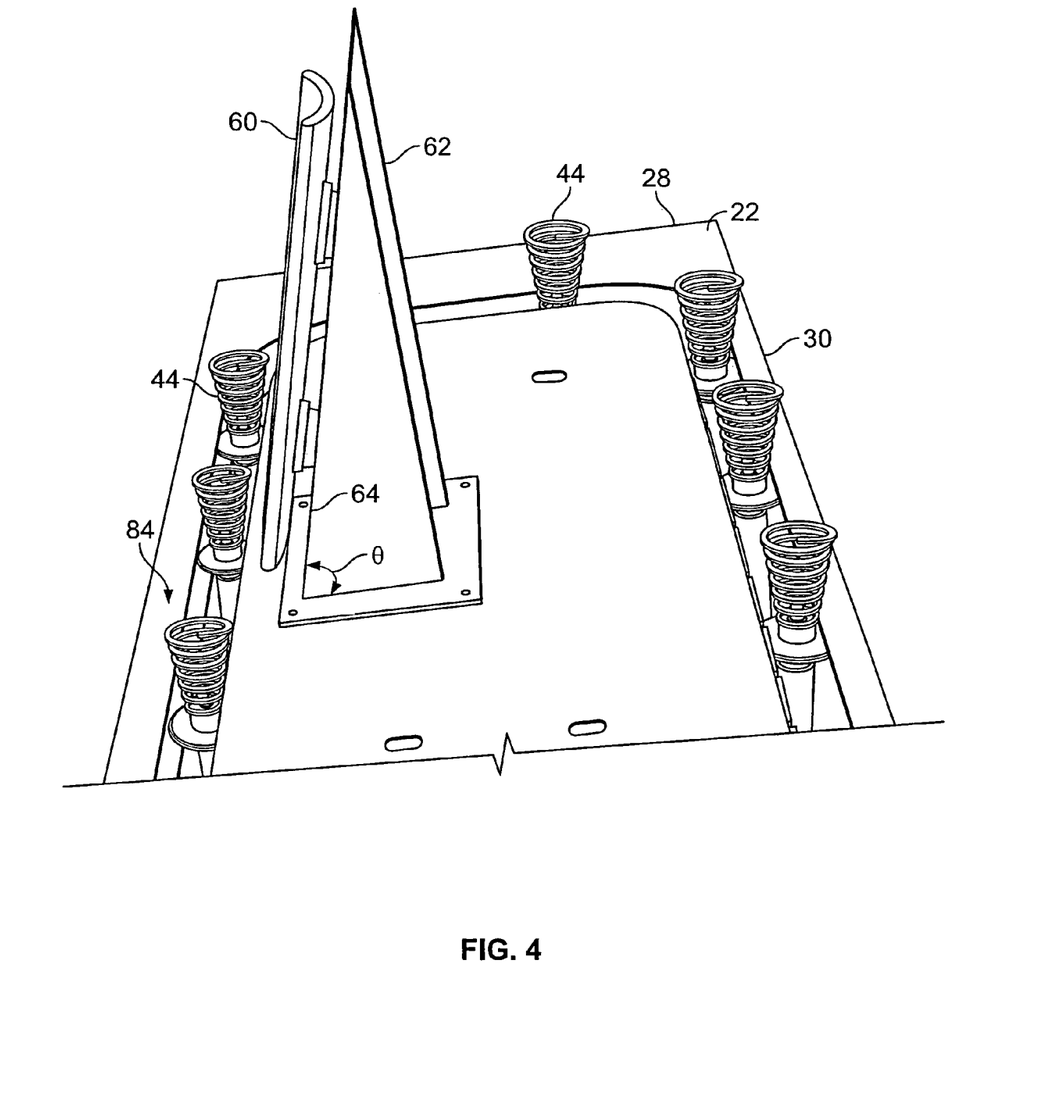
FIG. 4 shows a perspective view of the oven shown in FIG. 1 and FIG. 2 with the oven's upper housing removed to show the routing of the carousel conveyor and an inclined heating element used to heat cones.
Figure 5:
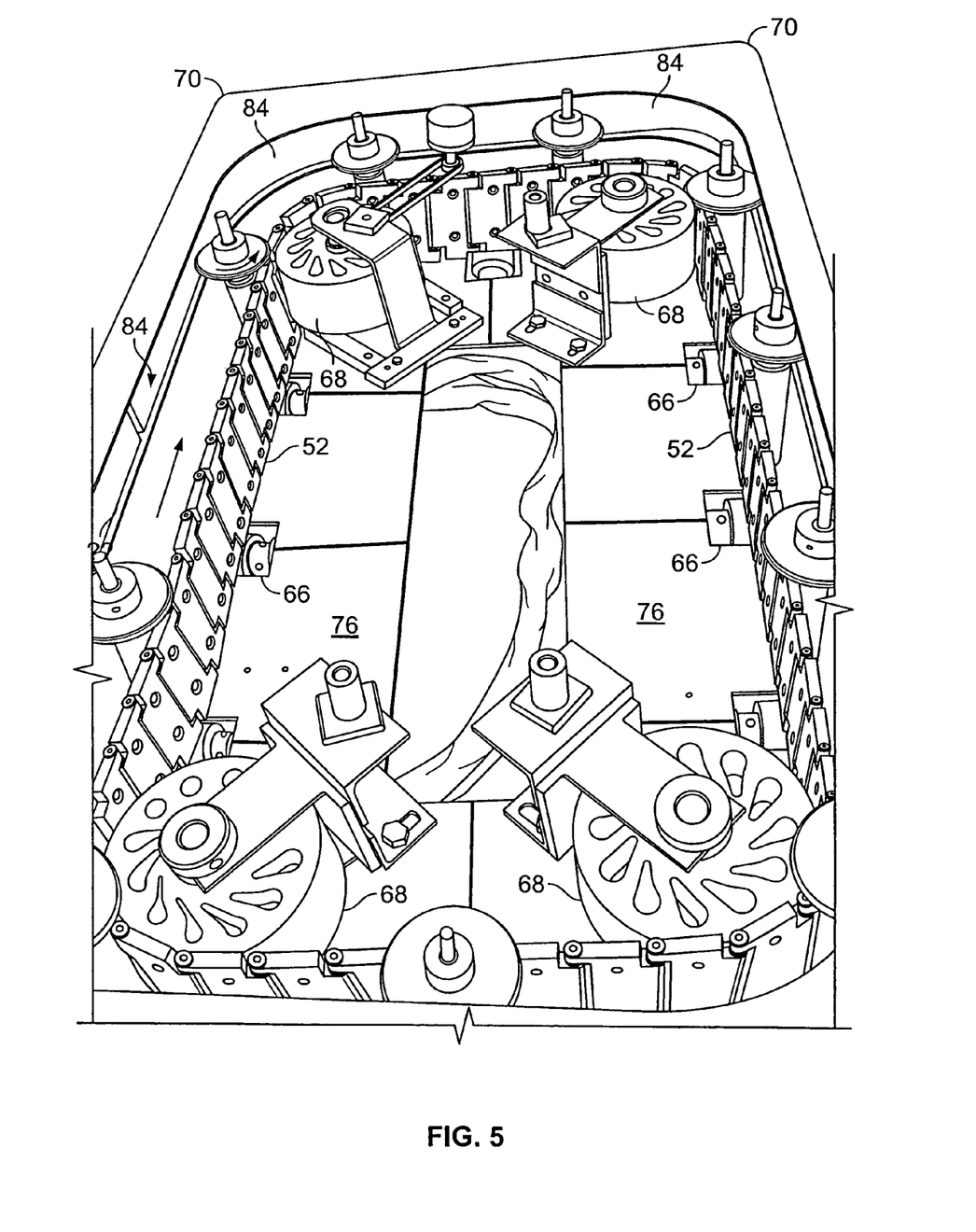
FIG. 5 shows a perspective view of the oven's base unit as viewed from the left side of the oven with the top of the oven's base unit removed to show details of the horizontal carousel conveyor.

Referring again to FIG. 4, which shows a perspective view of the interior of the oven 10 but with the upper housing 12 detached and removed from the base unit 24 to reveal details of the conveyor's routing through the oven 10. As can be seen in FIG. 4, a heater element 60 is mounted to a triangularly-shaped sheet metal heater support bracket 62. The path followed by the conveyor runs across the front of the oven, into the oven along the oven's left side, across the back or rear of the oven from left to right and back out of the oven 10 along the oven's right side.

Figure 6:
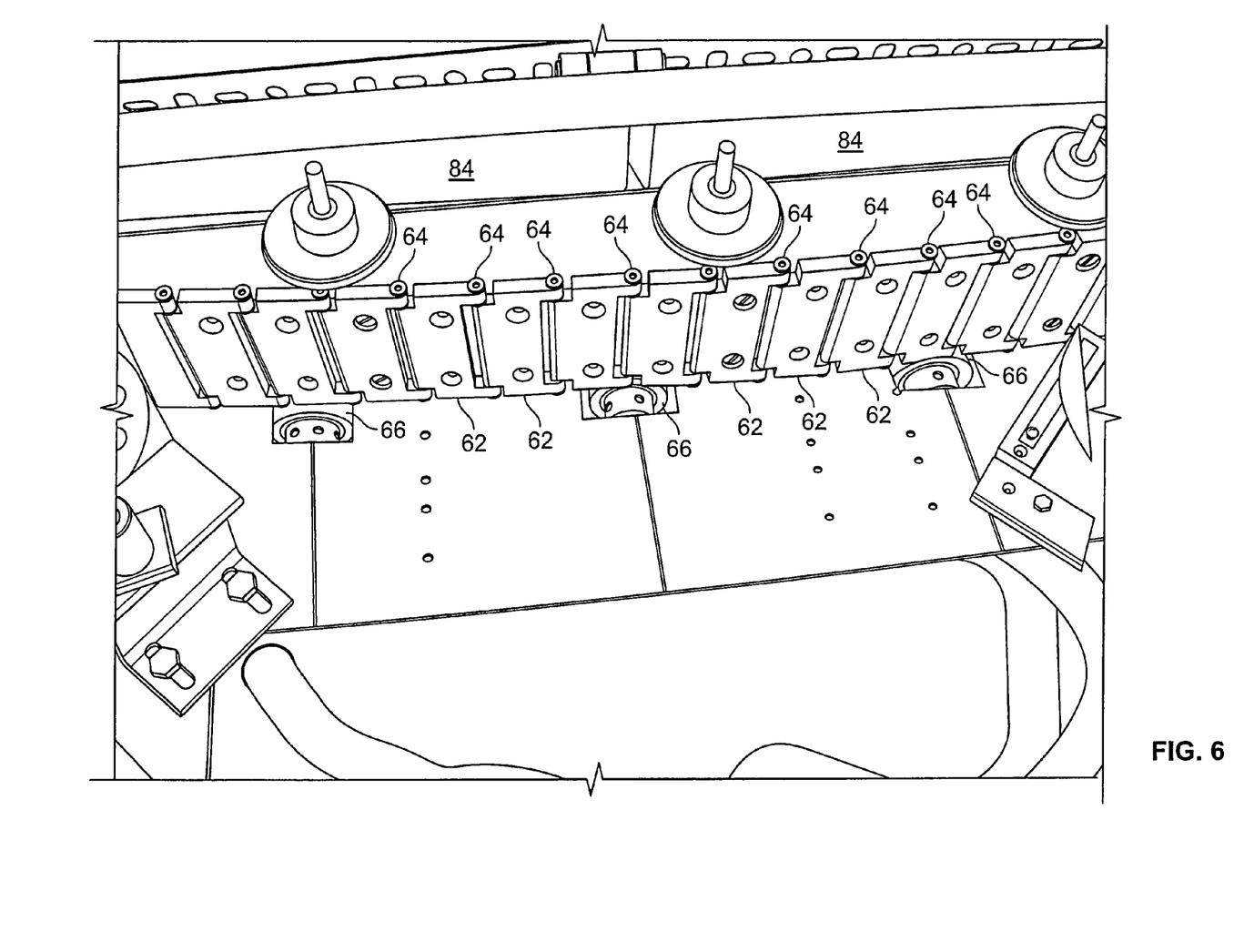
FIG. 6 shows a perspective view of the oven's base unit as viewed from the front of the oven with the top of the base unit removed to show additional details of the carousel conveyor.
Figure 7:
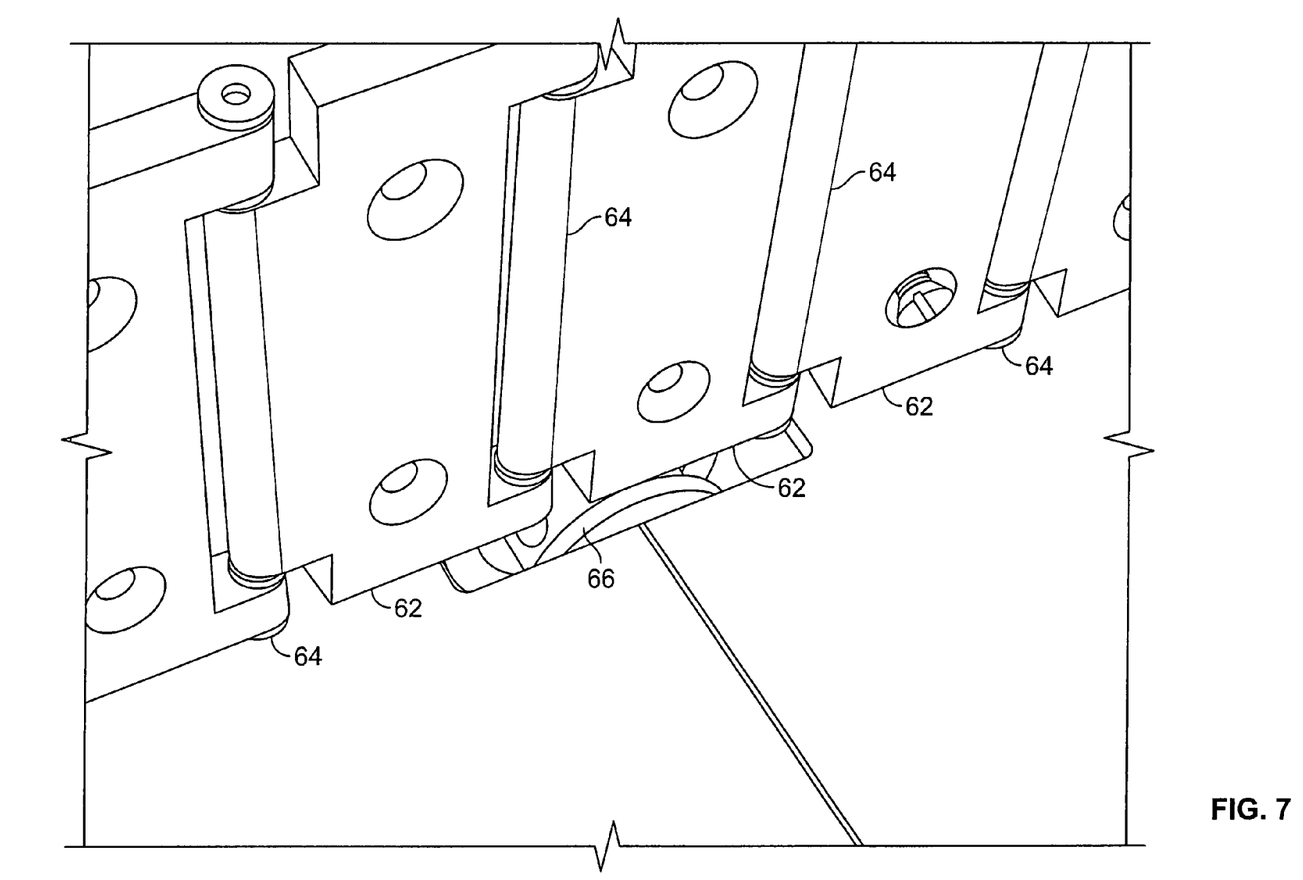
FIG. 7 shows the attachment of the links to each other and how the links of the carousel conveyor ride in and are guided by roller bearings.

FIG. 6 shows a top view of the base portion 24 of the oven 10 but with the top surface 22 removed to expose additional detail of the horizontal conveyor 42 and the links thereof. As can be seen in the figure and as described above, the horizontal conveyor 42 is constructed from several rectangular metal links 62 that are joined to each other by vertically-oriented hinge joints 64.

The hinge joints 64 are considered vertically-oriented because the hinge pins around which the links 62 pivot are vertical. The hinge pins are relatively small-diameter cylinders or rods around which a hinge link pivots.

As can be seen in the figure, the belt links 62 of the conveyor 42 are rectangular plates. Because of their weight, the assembled belt links 62 that form the continuous, closed loop horizontal conveyor 42 ride on bearings 66 that are located around the interior of the base unit 24 to support the conveyor. In the embodiment shown in the figures, the bearings 66 are roller bearing having a center axis of rotation that is horizontal. As can be seen too, the roller bearings 66 have an exterior journal or channel, the width of which accommodates the thickness of the links 62 of the conveyor 44.

The conveyor's links 64 are held upright and under an appropriate but moderate tension by pliable rollers 68. Two such rollers or equivalents thereof are needed to hold the conveyor upright. In the embodiment shown in the figure, however, four such rollers 68 are used with one located at each corner 70 of the base unit 24. Alternate embodiments include multiple rollers placed on both sides of the conveyor so as to wind the conveyor back on its self as it rotates around a path.

The tension exerted on the conveyor 42 shown in the figure is provided by force exerted on the conveyor 42 by the resilient material from which the rollers 68 are formed. The amount of tension exerted on the conveyor 42 keeps the conveyor 42 frictionally engaged to the rollers 68.

In an application such as an oven, oven components, including the conveyor links and rollers 68 are made from heat-tolerant materials. In one embodiment, the links 62 of the conveyor were made from aluminum plate. In alternate embodiments, the links 62 could be formed using plastic or other materials. The pliable rollers were formed from polyester.

The conveyor 42 is driven by a motor located beneath the bottom of a plate 76 so as to be protected from heat emanating from the upper portion of the oven. The motor is preferably a variable speed motor in order to provide some control over foodstuff heating other than by the heat energy provided by the heating element 60.

Figure 8:
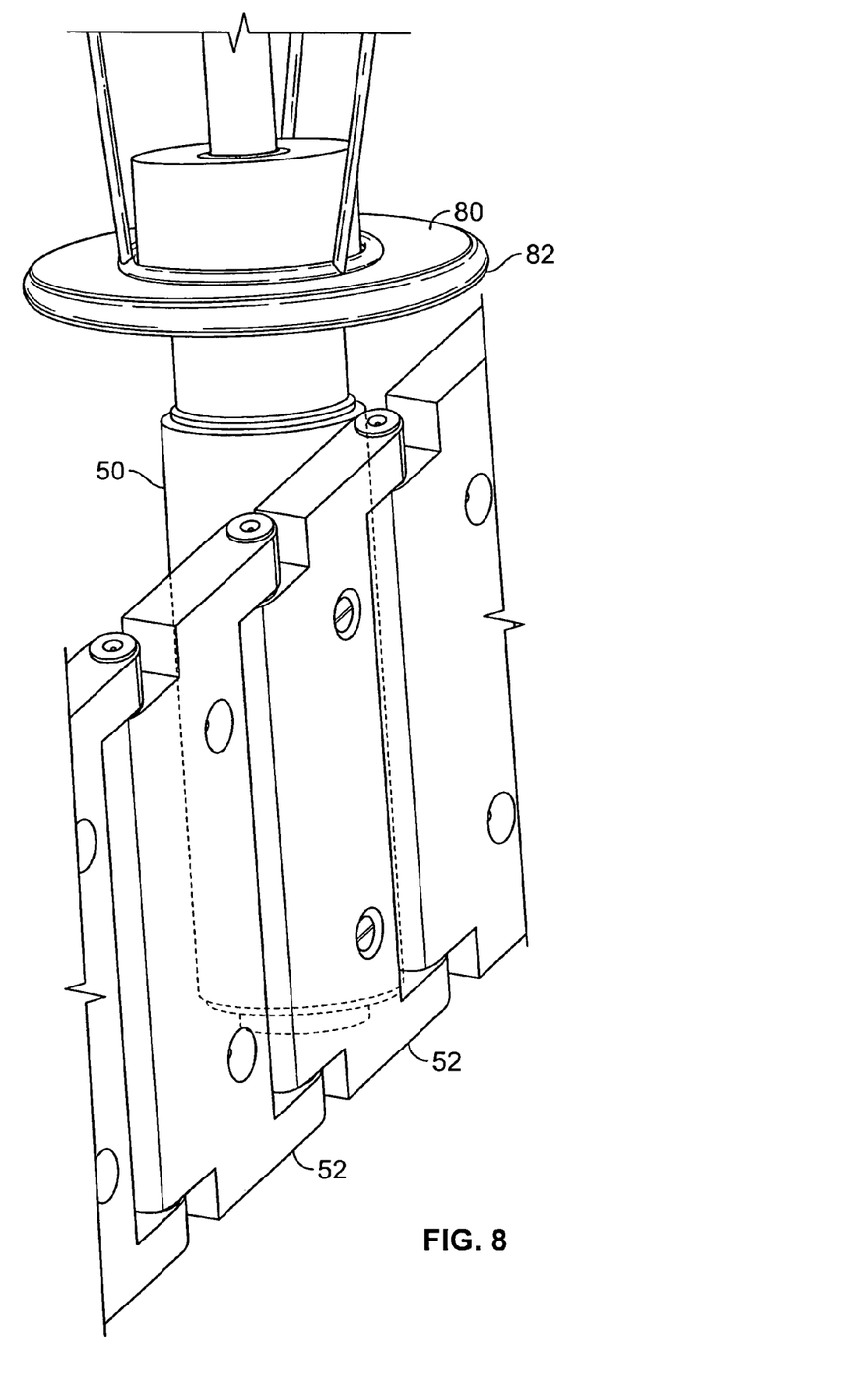
FIG. 8 shows the mounting of a heating station to a link of the carousel conveyor.

Referring now to FIGS. 8 and 9, the structure of a heating station 42 is shown in greater detail. The heating station 42 has the cone-shaped basket or coil attached to a mounting boss 50, the top of which is fixed to or formed to have relatively large diameter wheel 80 having a central axis of rotation. The outer circumference of the wheel 80 is formed to have a chamfer into which a heat-resistant nylon or neoprene O-ring 82 is placed. When a heating station 42 is attached to a conveyor link 52, the O-ring 82 will frictionally engage a sheet metal drive plate or drive strip 84 that runs along the pathway traced out by the O-rings 82 as the mounting boss is carried around the pathway of the conveyor 42. The drive plate 84 is adjustable and moved inwardly so that the O-rings ride against the drive plate to cause the wheel 80 and the attached heating station 42 to rotate as the heating station 42 moves. Thus, when the conveyor 42 moves, the heating station 42 rotates, so long as there is a drive plate 84 that is engaged by the O-ring 82.

As shown in FIG. 6, the drive plate 84 extends from the left side of the base unit 24, across the back of the base unit 24 and part way up the right side of the base unit 24 in order to rotate the heating station as it moves through the upper housing 12 of the oven 10 and past the heating element 60.

While the description above is of one embodiment, the true scope of the invention is set forth in the following claims.

What is claimed is:

1. A horizontal carousel conveyor for an oven comprising:
   a plurality of vertically-hinged belt links, each belt link being hingedly attached to an adjacent link, said vertical belt links being joined together to form a closed loop; and
   at least one roller bearing having a substantially horizontal center axis of rotation and wherein an edge of said conveyor belt links ride over said roller bearing.

2. The conveyor of claim 1 further comprised of at least one roller bearing having a substantially horizontal center axis of rotation and wherein an edge of said conveyor belt links ride over a exterior journal in said roller bearing.

3. The conveyor of claim 1 further comprised of at least first and second pliable rollers, sized, shaped and arranged to hold the conveyor links upright.

4. The conveyor of claim 1 wherein said conveyor links are made from a heat tolerant material.

5. The conveyor of claim 1 wherein said conveyor links are made from rectangular metal plates.

6. The conveyor of claim 1 wherein said conveyor links are aluminum.

7. The conveyor of claim 1 further including a drive motor, coupled to said conveyor to move the conveyor in a substantially horizontal plane.

8. The conveyor of claim 7 wherein said motor is a variable speed motor.

9. The conveyor of claim 1 further comprised of a heating station, operatively coupled to at least one link of the conveyor.

10. The conveyor of claim 9 wherein the heating station includes a wheel that engages a drive plate, said wheel and drive plate causing the heating station to rotate as the conveyor moves.

11. A horizontal carousel conveyor for an oven comprising:
    a plurality of vertically-hinged belt links, each belt link being hinged to an adjacent link by a vertically-oriented hinge pin, said vertical belt links being joined together to form a closed loop;
    at least one roller bearing having a substantially horizontal center axis of rotation and wherein an edge of said conveyor belt links ride over said roller bearing; and
    a heating station, operatively coupled to at least one link of the conveyor.

12. A horizontal carousel conveyor for an oven comprising:
    a plurality of vertically-hinged belt links, each belt link being hinged to an adjacent link by a vertically-oriented hinge pin, said vertical belt links being joined together to form a closed loop;
    at least one roller bearing having a substantially horizontal center axis of rotation and wherein an edge of said conveyor belt links ride over said roller bearing; and
    a rotating heating station, operatively coupled to at least one link of the conveyor.

* * * * *